United States Patent [19]
Hartzell et al.

[11] 3,716,084
[45] Feb. 13, 1973

[54] SAWMILL OFF BEARER

[75] Inventors: George W. Hartzell; Robert J. Gunnerman, both of Piqua, Ohio

[73] Assignee: Hartzell Industries, Inc., Piqua, Ohio

[22] Filed: Feb. 13, 1970

[21] Appl. No.: 11,067

[52] U.S. Cl. ............................143/157 D, 143/157 E
[51] Int. Cl. ..............................................B27b 31/08
[58] Field of Search .........143/157, 157.4 D, 157.5 E

[56] References Cited

UNITED STATES PATENTS

| | | | |
|---|---|---|---|
| 1,803,857 | 5/1931 | Lumb | 143/157 D X |
| 771,836 | 10/1904 | Schantz | 143/157 D |
| 693,630 | 2/1902 | Thomas | 143/157 D |
| 3,246,675 | 4/1966 | Sweetser | 143/157 D |

*Primary Examiner*—Donald R. Schran
*Attorney*—Dybvig & Dybvig

[57] ABSTRACT

As boards are being cut from a log, they are moved over an inclined slide. When fully cut away from the log, the boards fall down the slide away from the cutting area. To insure that longer boards are moved away from the saw blade a horizontal shelf may be mounted on the slide for temporarily supporting the leading end of the board. As the trailing end of the board is cut free, it falls down the slide and pulls the leading end off the shelf.

The slide is shown in association with two board handling systems. In one system a stop and dump assembly including arms for receiving the freshly cut board is mounted at the base of the slide. The arms are movable for also stopping the boards on the slide and for dumping trash therefrom.

The other system includes a screw roll conveyor mounted at the base of the slide adapted to convey cut boards longitudinally of the screw roll conveyor and parallel to the travel of the log from which the board is cut. Immediately adjacent the screw roll conveyor is a chain conveyor for conveying boards in a direction perpendicular to the movement of the log. To position the boards on the chain conveyor, one of the screw rolls remote from the saw blade is moved to an upper position to stop boards from moving longitudinally of the screw roll conveyor. The raised screw roll is still rotated so that it, along with the other screw rolls, tends to cam or convey the freshly cut boards in a direction perpendicular to the rotation of the rolls and onto the chain conveyor.

9 Claims, 6 Drawing Figures

PATENTED FEB 13 1973 3,716,084
SHEET 1 OF 2
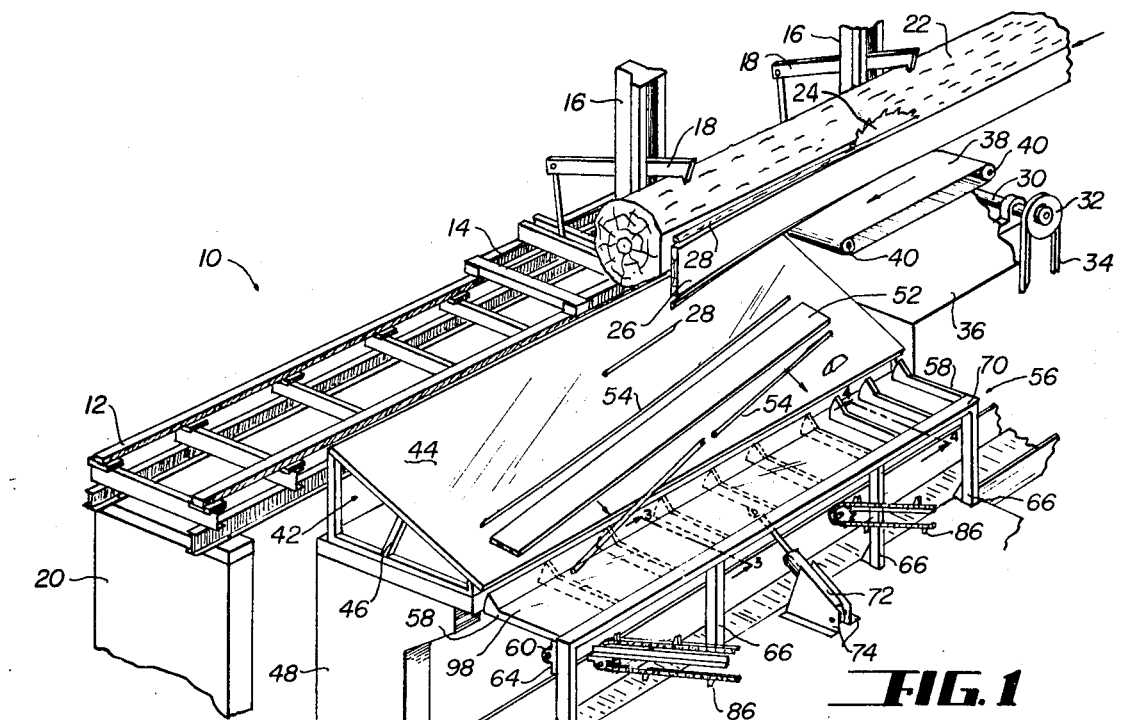
FIG. 1
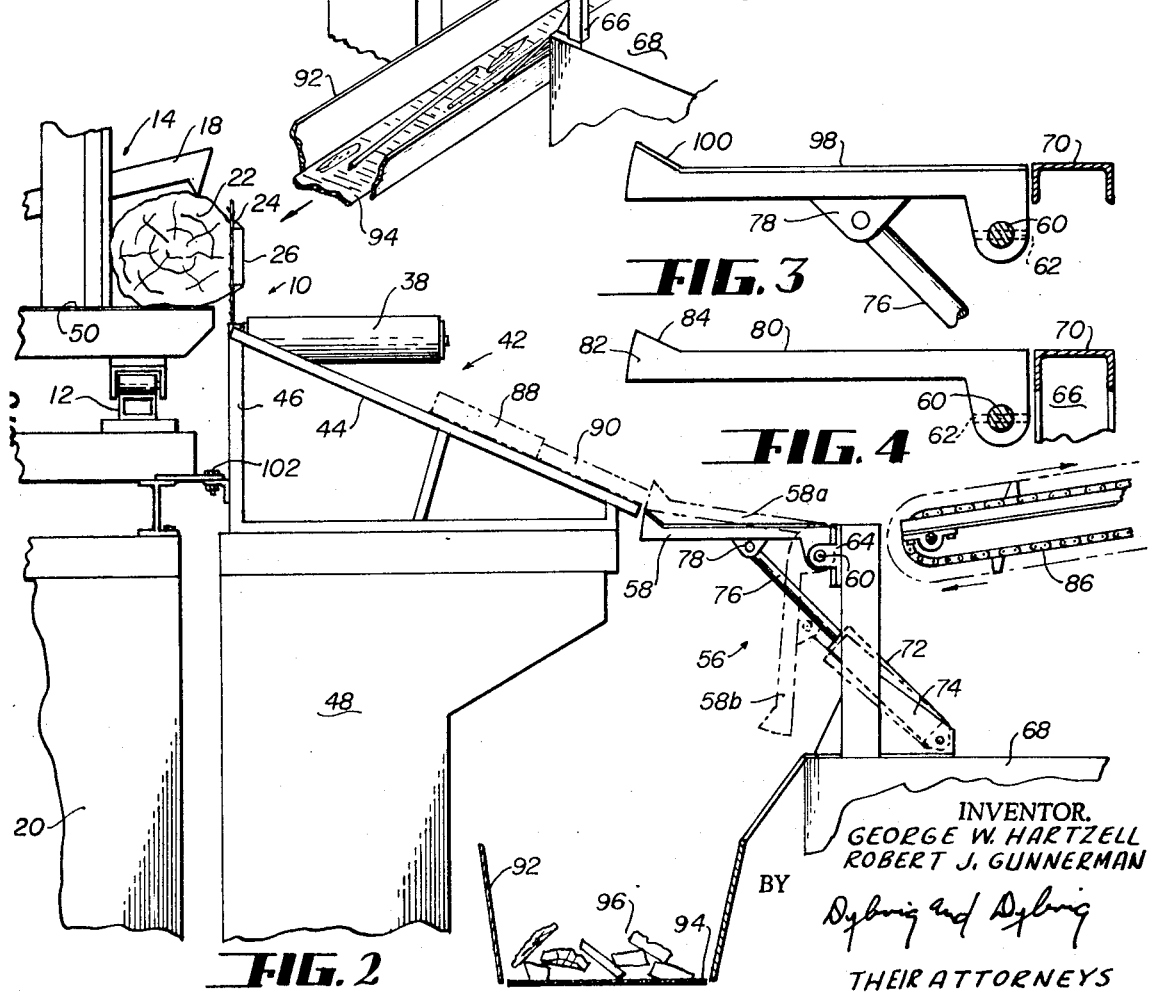
FIG. 2
FIG. 3
FIG. 4
INVENTOR.
GEORGE W. HARTZELL
ROBERT J. GUNNERMAN
BY Dybvig and Dybvig
THEIR ATTORNEYS

INVENTOR.
GEORGE W. HARTZELL
ROBERT J. GUNNERMAN
BY
THEIR ATTORNEYS

SAWMILL OFF BEARER

This invention relates to a sawmill off bearer used in the handling of boards freshly cut from logs.

A variety of arrangements, called off bearers, have been used for removing freshly cut boards away from the cutting area of a sawmill. Typically, an off bearer constitutes a simple conveyor. However, conveyors are not ideally suited for this purpose because the boards may not be moved away from the cutting area in sufficient time to avoid interferring with subsequently cut boards, and there is no good method of handling the sawdust and other trash which accumulates adjacent the cutting area.

In accordance with this invention, the off bearer consists primarily of a simple sloping slide, the upper end of which is beneath the bottom of the log being cut. Using the slide there is no danger that the boards already cut will interfere with boards being cut since the cut boards must fall down the slide. Trash cannot accumulate adjacent the cutting area because the trash also falls down the slide.

Also in accordance with this invention, a short conveyor belt is provided immediately adjacent the blade to assist in moving the boards and the trash to the slide. The conveyor belt is useful in handling all of the cut boards regardless of their length. If substantially long boards are to be cut, a small horizontal shelf is mounted on the slide for temporarily supporting the leading end of the board as it is being cut. When the trailing end is cut away from the log the conveyor conveys the trailing end over to the slide at which time the trailing end falls and pulls the leading end off the slide. The shelf thus prevents boards from becoming wedged in a diagonal position along the slide.

Further in accordance with this invention, the base of the slide overlies a conventional trash conveyor, and a stop and dump assembly is provided at the lower end of the slide with arms that may be positioned for receiving the cut boards. The arms are movable and can be lowered to dump accumulated trash into the trash conveyor. The arms are also movable to a slightly raised position to serve as stops for retaining the cut boards on the slide. Such stops are desirable in the event the boards are cut at a faster rate than they can be handled at the stop and dump assembly.

As an alternative to the stop and dump assembly, the slide can conveniently be used with a screw roll conveyor of the type adapted to convey material received thereon in either a direction perpendicular to the direction of movement of the log or in a direction parallel to the direction of movement of the log. The ordinary screw roll conveyor is provided with a steel plate or the like that can be raised from the deck of the conveyor to stop the leading end of the boards to be conveyed. Because a board falling down the slide may fall at an angle and wedge against such a movable stop, a novel screw roll conveyor is provided for use in association with the slide that includes a screw roll which is used as a stop, the screw roll being movable from a lowered position substantially coplanar with the other screw rolls to a raised position. When in the raised position, it prevents boards from being conveyed longitudinally of the screw roll conveyor. Instead, due to the screw action of the screw rolls, the boards are conveyed transversely. One of the screw rolls is used as a stop so that its threads will engage the leading end of the cut board moving it laterally away from the slide thereby preventing the board from wedging or dragging thereagainst.

Other objects and advantages will become apparent from the following description and the drawings in which:

FIG. 1 is a perspective view of a portion of a sawmill provided with an off bearer including a slide and a stop and dump assembly in accordance with this invention;

FIG. 2 is an end elevation of the sawmill of FIG. 1;

FIG. 3 is a cross sectional view of a portion of the stop and dump assembly as viewed in the direction of arrows 3—3 of FIG. 1;

FIG. 4 is a cross sectional view of another portion of the stop and dump assembly as viewed in the direction of arrows 4—4 of FIG. 1;

Figure 5:
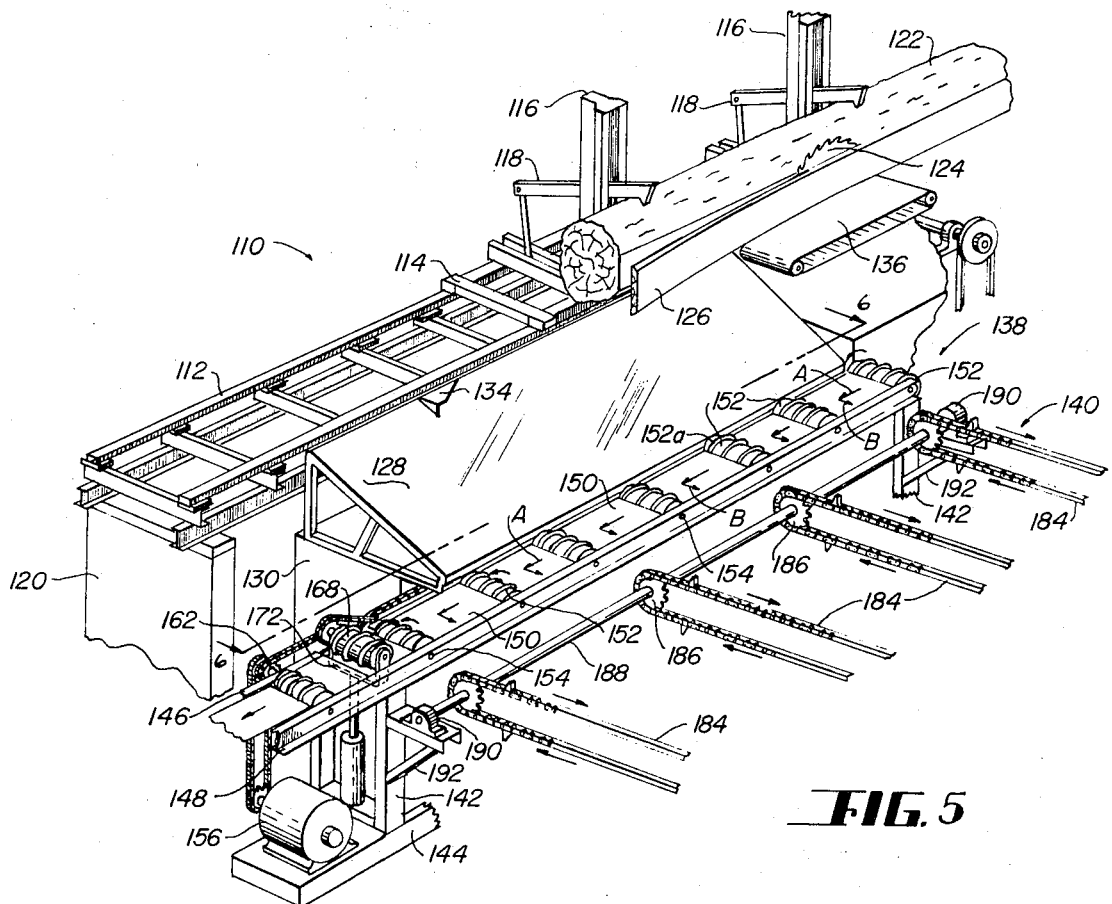
FIG. 5 is a perspective view of a portion of a sawmill provided with a modified off bearer including a slide with a horizontal shelf and a screw roll conveyor system made in accordance with this invention.

Referring to the drawing in greater detail, a portion of a sawmill, generally designated 10, is illustrated in FIGS. 1 and 2 including a carriage track 12 on which is driven a carriage 14 having upright stanchions 16 and saw dogs 18. It will be understood that the carriage track 12 is mounted upon platforms or the like such as the support leg 20. Since the carriage, the saw dog construction and the supports therefor form no part of this invention, they are only partially illustrated in FIGS. 1 and 2. Those familiar with the art will realize, for example, that there may be more stanchions 16 and saw dogs 18 than the two such members illustrated.

In operation, logs such as that shown at 22 are held by the dogs 18 on the carriage 14 and reciprocated past a vertically disposed circle saw blade 24 by to-and-fro movement of the carriage 14 upon the track 12. As the carriage 14 moves the log 22 past the saw blade 24, a board, designated 26, is cut therefrom. After the board 26 is fully cut away, the carriage 14 is returned to the right as viewed in FIG. 1 and the log 22 advanced toward the vertical plane of the saw blade 24 so as to present another portion of the log 22 to the cutting edge of the saw 24. The log 22 is thus reciprocated and advanced incrementally toward the saw blade 24 until it is fully cut into boards.

In FIG. 1, the log 22 is also shown cut horizontally along the top and bottom edges of the board 26. The cuts along these edges may be accomplished by a saw construction known as a "vertical edger" which has a pair of saw blades mounted for rotation about a vertical axis. The vertical edger is not shown in the drawing, but, of course, would be off to the right side of FIG. 1. As a result of the combined cutting by the vertical edger blade and the saw blade 24, a pair of edging strips 28 are cut from the log 22 and the board 26 at the same time as the board 26 is cut.

The circle saw may be powered in any suitable fashion. In FIG. 1 there is shown a drive shaft 30 having a drive pulley 32 on one end thereof driven by a belt 34 which in turn is driven by an adequate prime mover such an an electric or diesel motor or the like. The drive for the saw blade 24 may be enclosed within a housing such as that indicated at 36.

As will be described below, the boards as they are being cut from the log 22 are moved over a slide assembly generally designated 42, and when fully cut, fall down the slide assembly 42 away from the saw blade 24. Movement of the freshly cut boards, especially at the trailing ends thereof, away from the saw blade 24 is assisted by a short conveyor belt 38 extending around rollers 40 which may be powered in any suitable manner off the drive shaft 30. The top side of the conveyor belt 38 is essentially coplanar with the log support surface of the carriage 14 and the belt 38 is so driven that it moves forwardly, that is to the left as indicated by the arrow in FIG. 1. In addition to assisting in moving the freshly cut boards away from the saw area, the conveyor belt 38 removes sawdust, the edging strips and other debris from the immediate area of the saw blade 24.

The slide assembly 42 mentioned above is positioned immediately forward of the saw blade 24 and the conveyor belt 38. The slide assembly 42 includes an inclined, elongate plate-like slide 44 mounted on a framework 46 that in turn is supported in fixed relation to the track 12 and saw blade 24 by support members such as the illustrated support leg 48. The upper end of the slide 44 is located just beneath the lowermost log support surface, designated 50, of the carriage 14 and the slide 44 slopes downwardly away from the carriage. Further, the slide 44 is sufficiently long and is located sufficiently close to the saw blade 24 that a board will not be fully cut from a log until it extends substantially fully thereover. Accordingly, as soon as a board is fully cut, it falls onto and down the slide 44. The powered conveyor belt 38 insures that the trailing end of the freshly cut board is moved away. There is thus no danger that the freshly cut boards will interfere with subsequent sawing operations, the boards being rapidly and safely moved away from the cutting area. FIG. 1 illustrates a freshly cut board 52 falling down the slide 44 away from the track 12. The trash associated therewith, such as sawdust and the edging strips 54, also falls away from the cutting area.

To conveniently handle the freshly cut boards after they have dropped down along the slide 44, a stop and dump assembly, generally designated 56, is provided which extends substantially the entire length of the slide 44. The stop and dump assembly 56 includes a plurality of substantially identical, equally spaced stop and dump arms 58, each of which is affixed to a tie rod 60 such as by a pin 62. The tie rod 60 is journalled for rotation about a horizontal axis parallel to the plane containing the lowermost edge of the slide 44. For this purpose the ends of the tie rod 60 are rotatably mounted in brackets 64 mounted upon a supporting framework including plural vertical support posts 66 mounted on a support platform 68, the upper ends of which are rigidly interconnected by a channel member 70. The stop and dump arms 58 project perpendicularly from the tie rod 60 and, because they are pivotal about the longitudinal axis of the tie rod 60, they may be positioned in the generally horizontal position shown in FIG. 1 between the tie rod 60 and the lower end of the slide 44.

The positions of the stop and dump arms 58 are controlled by a positioning device connected thereto which, as shown in FIGS. 1 and 2, may comprise a hydraulic actuator cylinder 72 pivotally mounted upon brackets 74 affixed in the platform 68. The cylinder 72 drives a piston rod 76 pivotally connected to a bracket 78 depending from one of the stop and dump arms 58. Using suitable conventional hydraulic controls (not shown), the stop and dump arms 58 may be positioned essentially horizontally as shown in FIG. 1 and in full lines in FIG. 2, or they may be pivoted upwardly about the axis of the tie rod 60 to the position designated by phantom lines 58a in FIG. 2. Further they may be lowered or dropped to a generally vertical position as indicated by phantom lines 58b in FIG. 2.

Referring to FIG. 4, each stop and dump arm 58 has a planar top surface 80 of sufficient length to support the width of a cut board and extending between the end thereof affixed to the tie rod 60 and the other, free end thereof adapted to be positioned adjacent the lower end of the slide 44. The free end is flared as indicated at 82 and has an inclined top surface 84 continuous with the elongate top surface 80. In the position of the stop and dump arms 58 wherein the elongate top surfaces 80 thereof are substantially horizontal, the inclined top end surfaces 84 are nearly aligned with, or below, the inclined top surface of the slide 44. Accordingly, when the stop and dump arms 58 are so positioned, freshly cut boards will simply slide off the lower end of the slide 44 onto the elongate top surfaces 80 of the arms 58.

In normal use an assistant to the sawyer, such as a grader, will handle freshly cut boards so deposited on the stop and dump assembly 56. The grader may, for example, move the boards from the stop and dump assembly 56 to conveyor chains 86 located on the side of the stop and dump assembly 56 opposite from the slide 44. The conveyor chains 86 may convey the graded boards to a trim saw or other finishing device. Because of the speed of operation of modern sawmills, the grader may fall behind in his work. If this event should occur, the grader may cause the stop and dump arms 58 to be pivoted upwardly to the phantom line position designated 58a in FIG. 2 whereupon the flared end portions 82 serve as a stop for holding the freshly cut boards such as those designated by phantom lines 88 and 90, on the slide 44.

When trash on the stop and dump arms 58 interferes with the work of the grader, he may actuate the cylinder 72 causing it to retract its piston 76, thus lowering the stop and dump arms 58 into the vertical position designated by phantom lines 58b in FIG. 2, whereupon the accumulated trash will be dumped. A hopper 92 and conventional trash conveyor 94 are provided beneath the lower end of the slide 44 and the stop and dump arms 58 for removing trash, such as the pile of scraps designated 96, away from the area beneath the slide 44 and stop and dump arms 58.

The stop and dump arms 58 farthest from the saw blade 24 are preferably covered and spanned by a cover plate 98 that is bent upwardly as indicated at 100 in FIG. 3 so that its top surface is parallel throughout its width to the top surfaces 80 and 84 of the stop and dump arms 58. The cover plate 98 provides a smooth, unobstructed surface for receiving the leading ends of freshly cut boards falling off the slide 44. Preferably the stop and dump arms 58 closest to the saw blade 24 are uncovered so that most of the sawdust, bark and small root ends falling off the conveyor 38 will slide and fall directly down onto the trash conveyor 94.

Provided the inclined slide 44 is positioned where described above and slopes away from the carriage track 12, there need be no connection to the track 12. For rigidity, the slide frame 46 is shown connected by brackets 102 to the track 12 in FIG. 2.

The hydraulic cylinder 72 and its piston rod 76 constitute a double acting, linear fluid motor which can be stopped and held by conventional controls in any of the positions illustrated in FIG. 2. For convenience the uppermost position 58a of the arms 58 may be reached when the piston rod 76 is fully extended and the lowermost position 58b reached when the piston rod 76 is fully retracted. Since suitable controls for the hydraulic unit 72,76 are well known, they are not illustrated herein.

Figure 6:
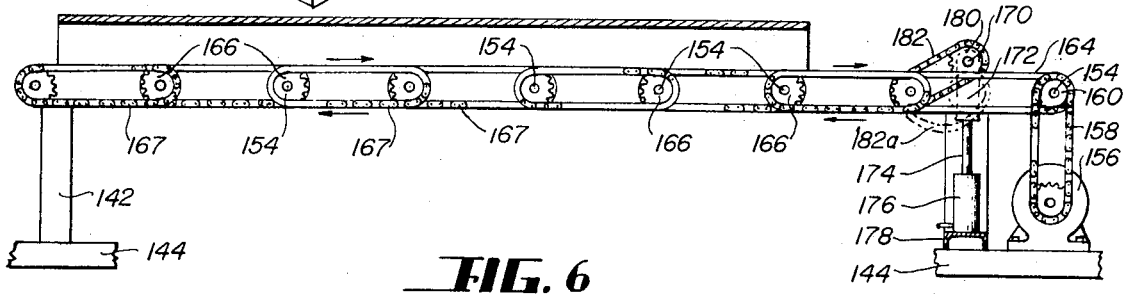
FIG. 6 is a cross sectional view taken along line 6—6 of FIG. 5 and showing the drive for the screw roll conveyor.

Referring to FIGS. 5 and 6, a portion of another embodiment of a sawmill, generally designated 110, is shown in FIG. 5 including a carriage track 112 on which a log carriage 114 having upright stanchions 116 and saw dogs 118 is driven. The carriage track 112 is mounted on a suitable platform including, for example, a support leg 120. These parts of the sawmill of FIG. 5 are identical to those illustrated in FIG. 1. Again a log such as that designated 122 is carried by the stanchions 116 and saw dogs 118 past a vertical saw blade 124 for cutting boards, such as that designated 126, therefrom. In the embodiment of FIG. 5, the board 126 being cut does not have the vertical edging strips cut therefrom although of course a vertical edger could be used.

The off bearer for the sawmill 110 includes an inclined slide 128 mounted on a platform 130 in identical fashion to the previously described slide 44. The slide 128 is provided in this case with a small horizontal shelf 134 located near its top edge and remote from the saw blade 124. The purpose of the shelf 134 is to temporarily slow down the sliding of the leading end of a long board to prevent such a long board from reaching the bottom of the slide 128 before the trailing end is cut free from the log. If that should happen, the board might rest diagonally on the slide 128 and not be properly conveyed from the area of the saw blade 124. Thus, the leading end of a board being cut, if it is sufficiently long, will first slide over the shelf 134 rather than down the slide 128. As the trailing edge of the board is cut free, it is conveyed from the saw blade 124 by a small, power operated conveyor belt 136 to a position over the slide 128. Because the board is then supported only by the shelf 134, it is off balance and its trailing end will begin to fall down the slide and pull the leading end off the shelf 134. Although there are other differences between the off bearer shown in FIG. 5 and that shown in FIG. 1, it is obvious that a shelf identical to shelf 134 could be located to advantage on the FIG. 1 slide 44.

Mounted in any suitable fashion adjacent the side of the slide 128 opposite the carriage track 112 is a conveyor system including a screw roll conveyor, generally designated 138, and a chain conveyor, generally designated 140. The screw roll conveyor 138 is mounted at the base of the slide 128 and includes plural vertical support members 142 mounted upon a suitable base or platform 144. Supported on top of the vertical support members 142 are a pair of spaced, horizontal and longitudinally extending I-beams or frame members 146 and 148 that are parallel to the carriage track 112. A plurality of spaced and coplanar horizontal deck plates 150 are welded to or otherwise supported by the frame members 146 and 148. A plurality of screw rolls 152, one between each pair of adjacent deck plates 150, are affixed to shafts 154 journalled in the space frame members 146 and 148 about parallel, transverse axes. As known to those familiar with the art, the screw rolls 152 are cylindrical members having a single helical bead or thread 152a of large pitch. They are rotated by means described below to cause boards to be conveyed longitudinally of the screw roll conveyor 138, in the direction of the arrows A in FIG. 5. If boards are stopped from longitudinal movement, they are moved in a transverse direction, as indicated by the arrows B, by the camming action of the threads or beads 152a.

The screw roll shafts 154 project beyond the outside of the frame member 146 and are driven by a chain and sprocket mechanism shown in FIG. 6 including a drive motor 156 and a drive chain 158 engaging a driven sprocket 160 affixed to the screw roll shaft 154 farthest to the right in FIG. 6. A drive sprocket 162 (FIG. 5) is mounted on the same shaft 154 and is connected by a chain 164 to a driven sprocket (not shown) on the next adjacent screw roll shaft 154 that is journalled for rotation in the frame members 146 and 148. All of the other screw roll shafts 154 with the exception of that farthest to the left in FIG. 6 have two sprockets 166 so that each shaft 154 is driven by the adjacent shaft 146 on the right through drive chains 167.

The screw conveyor 138 also includes a movable screw roll 168 having a shaft 170 journalled for rotation in the arms of a yoke 172 mounted on top of a piston 174 of a linear fluid actuator 176 which is fixedly mounted on a support channel 178. The screw roll shaft 154 directly driven by the drive chain 164 carries a drive sprocket (not shown) drivingly connected to a driven sprocket 180 on the movably mounted screw roll shaft 170 through a drive chain 182. In FIG. 5 and 6 the piston 174 is shown extended with the yoke 172 and, accordingly, the screw roll 168 is in an elevated position. At this time the drive chain 182 causes the screw roll 168 to rotate with and in the same direction as the screw rolls 152. When the screw roll 168 is in the elevated position illustrated, the leading ends of boards falling down the slide 128 will be prevented from moving longitudinally along the screw conveyor 138. Instead, the boards will be driven transversely of the screw conveyor 138 in the direction of the arrows B by the action of the screw roll threads 152a. The threads of the movable screw roll 168 also assist in moving boards transversely of the screw roll conveyor 138. The movable screw roll 168 is preferred to ordinary stops because the leading end of a board might wedge against or drag along a flat plate or similar stop and thereby convey off the screw conveyor 138 at a skew angle.

The movable screw roll 168 may be lowered by retraction of the piston 174 to a position substantially coplanar with the other screw rolls 152 in which case boards falling down the slide 128 will be conveyed longitudinally of the screw roll conveyor 138. As illustrated by phantom lines 182a in FIG. 6, the drive chain 182 is sufficiently long that it is slack when the screw roll 168 is lowered but taut when the screw roll 168 is raised.

The chain conveyor 140 includes a plurality of chains 184 passing over sprockets 186 on a shaft 188 journalled in bearing housings 190 mounted by brackets 192 to the adjacent vertical support members 142. The chains 184 are driven at their opposite ends (not shown) through drive sprockets or the like and are adapted to convey boards moved transversely off the screw roll conveyor 138. For this purpose the chains may carry spaced cleats 194 which assist in pulling the cut boards away from the screw roll conveyor 138.

It will be noted that both the screw roll conveyor 138 and the chain conveyor 140 will also convey away edging strips, if any, and other trash falling down the slide 128.

Although the presently preferred embodiments of this invention have been described, it will be understood that various changes may be made therein within the scope of the appended claims.

Having thus described our invention, we claim:

1. In a sawmill of the type having a saw blade mounted for rotation about a horizontal axis, means for supporting and advancing a log past said saw blade whereby a board is cut therefrom, an improved off bearer comprising an elongate slide located beyond said saw blade, said slide having a top surface located beneath the plane of the support for the log and sloping downwardly away from said support, means mounting said slide sufficiently close to said saw blade that a substantial portion of a board being cut projects over said slide whereby fully cut boards fall onto and down said slide, and a conveyor belt positioned adjacent said saw blade and having an upper surface generally coplanar to said plane of support for conveying trash away from the area of said saw blade to said slide and for assisting in removing the trailing ends of freshly cut boards away from said saw blade.

2. In a sawmill of the type having a saw blade mounted for rotation about a horizontal axis, means for supporting and advancing a log past said saw blade whereby a board is cut therefrom, an improved off bearer comprising an elongate slide located beyond said saw blade, said slide having a top surface located beneath the plane of the support for the log and sloping downwardly away from said support, means mounting said slide sufficiently close to said saw blade that a substantial portion of a board being cut projects over said slide whereby fully cut boards fall onto and down said slide, a stop and dump assembly positioned adjacent the lower end of said slide and extending substantially the entire length of said slide for receiving boards sliding off said slide, said stop and dump assembly including plural stop and dump arms, means mounting said arms for rotation about a horizontal axis which is substantially parallel to the lower edge of said slide, means connected to said arms for pivoting said arms about said horizontal axis, said stop and dump assembly further including a cover for the top surface of at least some of said arms and spanning the area between said arms whereby the movement of said cut boards down said slide will not be obstructed by those of said arms which are covered.

3. In a sawmill of the type having a saw blade mounted for rotation about a horizontal axis, means for supporting and advancing a log past said saw blade whereby a board is cut therefrom, an improved off bearer comprising an elongate slide located beyond said saw blade, said slide having a top surface located beneath the plane of the support for the log and sloping downwardly away from said support, means mounting said slide sufficiently close to said saw blade that a substantial portion of a board being cut projects over said slide whereby fully cut boards fall onto and down said slide, a stop and dump assembly positioned adjacent the lower end of said slide and extending substantially the entire length of said slide for receiving boards sliding off said slide, said stop and dump assembly including plural stop and dump arms, means mounting said arms for rotation about a horizontal axis which is substantially parallel to the lower edge of said slide, means connected to said arms for pivoting said arms about said horizontal axis, the ends of said arms remote from said horizontal axis being flared and having a sloping top surface to assist in guiding boards falling off said slide onto said stop and dump assembly, and said pivot means being operable to pivot said arms to an upper position wherein said flared ends are positioned relative to the lower edge of said slide to prevent movement of boards from said slide.

4. In a sawmill of the type having a saw blade mounted for rotation about a horizontal axis, means for advancing a log past said saw blade to cut a board therefrom, an improved off bearer construction comprising an elongate slide located beyond said saw blade whereby freshly cut boards fall along said slide from the upper to the lower end thereof, a stop and dump assembly positioned adjacent the lower end of said slide and substantially the entire length of said slide, said stop and dump assembly including a fixed support frame, a plurality of horizontally spaced arms pivotally mounted on said support frame and adapted to extend between said support frame and the lower end of said slide to span the area therebetween and means for controllably positioning said arms in at least three positions, a first position wherein said arms are generally horizontally extending to receive freshly cut boards sliding down said slide, a second position in which said arms are raised with the ends of said arms adjacent the lower end of said slide located above the level of the lower end of said slide to stop boards from sliding off said slide, and a third position with said arms pivoted downwardly to dispose of waste material therefrom.

5. The construction of claim 4 further including a trash conveyor positioned beneath said arms and the lower end of said slide for conveying waste dumped when said arms are lowered.

6. The construction of claim 4 wherein said stop and dump assembly further includes a plate covering at least some of said arms whereby movement of boards off said slide will not be obstructed by said arms which are covered by said plate.

7. For use in a sawmill, an off bearer for freshly cut boards comprising a slide, a plurality of arms located at the lower end of said slide, said arms having coplanar top surfaces and flared ends adjacent the lower end of said slide, means mounting the ends of said arms remote from said slide for pivotal movement about a horizontal axis, and means for pivoting said arms into three different positions and holding said arms in each of said three different positions, one of said positions being with said arms substantially horizontal and the top surface of said flared end portions thereof adjacent the lower end of said slide, a second position being with said arms pivoted upwardly with the end faces of said flared end portions located in a position to stop boards on said slide, and the third position being with said arms pivoted downwardly to dispose of waste material that has accumulated on said arms.

8. The apparatus of claim 7 wherein said positioning means comprises a fluid actuator having a piston connected to one of said arms and wherein all of said arms are affixed to a common pivot pin.

9. The apparatus of claim 7 wherein each of said arms is sufficiently long to support a freshly cut board on its top surface between said pivot point and said flared end thereof.

* * * * *